Aug. 6, 1963     B. REGENSCHEIT     3,099,965
JET CONVEYORS
Filed Jan. 2, 1958
FIG. 3
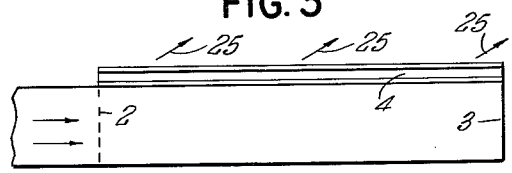
FIG. 2
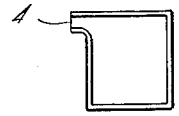
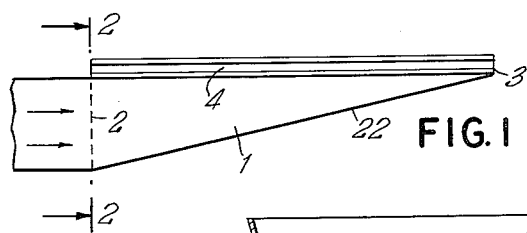
FIG. 1
FIG. 4
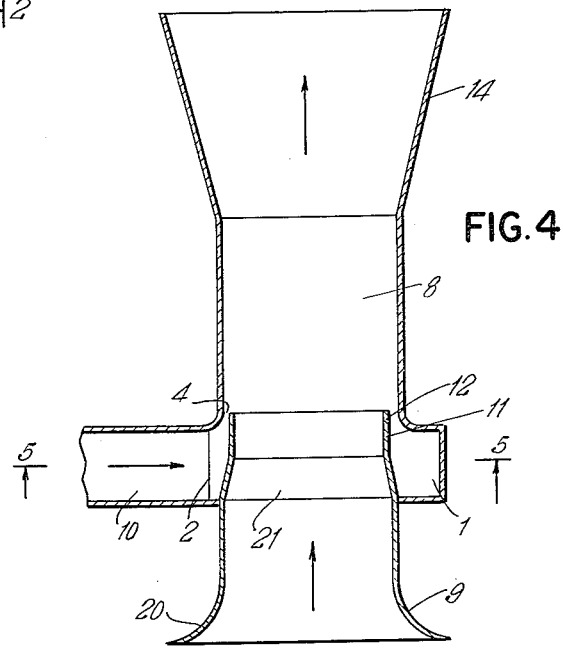
FIG. 5
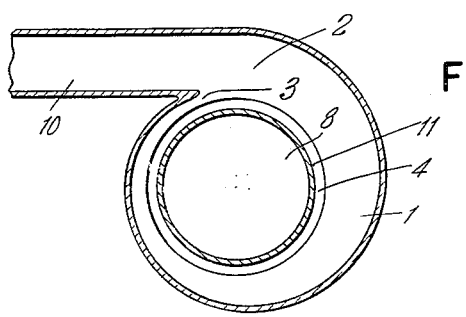
INVENTOR.
BRUNO REGENSCHEIT
BY
ATTORNEY 3,099,965
JET CONVEYORS
Bruno Regenscheit, Aachen, Germany, assignor to
Firma H. Krantz, Aachen, Germany
Filed Jan. 2, 1958, Ser. No. 706,665
2 Claims. (Cl. 103—263)

The present invention relates to jet conveyors and it particularly relates to jet conveyors for conveying gases and liquids.

Although not limited thereto, the present invention will be particularly described in its application to jet conveyors for conveying gases and liquids in circular passages with the propellant passageway area encircling the conveying passageway and in which the propellant desirably consists of a compressed gaseous fluid, such as air.

It is among the objects of the present invention to provide a jet conveyor which will have greatly enhanced efficiency and in which the jet will act in a predetermined uniform fashion over the entire periphery or cross-section of the diffuser without substantial loss of energy.

Another object is to provide a jet conveyor in which there will be a predetermined control assuring uniform distribution of the jet effect over the periphery or area of the conveying passage with resultant uniform entrainment and with a controlled directional discharge.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention, it has been found most satisfactory to supply the conveying gas through an inlet passage which will decrease in area as it departs from the inlet area or face of the incoming passage for the conveying gas.

Although the present invention will be particularly directed to passages which have a circular cross-section, it is to be understood that the same principle is applicable to passages of triangular, square, rectangular, hexagonal, octagonal, elliptical, or other polygonal or rounded cross-sections.

The essential feature of the present invention resides in the fact that where the conveying gas is fed into the passageway peripherally around the surface of such passageway, it is directed into or around a peripheral slot in such a way that the energy is not lost because of contact with the wall of the housing and so that the cross-sectional area of the passage will decrease as the terminal portion of the passageway is approached.

Preferably, the relationship is a linear relationship with the cross-sectional area decreasing to zero in a ratio determined by the cross-sectional area of the incoming passageway and the cross-sectional area of the blowout peripheral slot.

The inlet peripheral passageway, when unwrapped from the main conduit or passageway, may have an elongated right angular shape with the short base of the triangle constituting an inlet passage area for the jetting fluid while the long, straight side carries the elongated slot of constant width.

The length of the slot will be equal to the periphery or circumference of the passageway while the angle of the hypotenuse will determine the rate of constriction or decrease in area of the passageway supplying the jetting gas or air to the elongated slot.

Although the hypotenuse is desirably straight, by giving it either a convex or a concave conformation, a varying distribution of incoming jetting gas may be achieved around the periphery.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a development of a propellant passage for admitting the jetting gas or air to the conduit as it would be if unwrapped from said conduit and flattened.

FIG. 2 is a transverse sectional view of the inlet portion of said propellant introduction passageway.

FIG. 3 is a side elevational view of the passageway of FIG. 1.

FIG. 4 is a diagrammatic longitudinal cross sectional view of the jet conveyor with the passageway of FIGS. 1 and 2 assembled therewith and wrapped into its functional position.

FIG. 5 is a transverse sectional view taken upon the line 5—5 of FIG. 4.

Referring to FIGS. 4 and 5, the inlet 9 has a flared end portion 20 and it decreases in cross sectional area as indicated at 21 to form the inside spaced peripheral wall 11 of the aligned inlet conduit 9, the terminal end of which extends concentrically at 12 into the conveying passage 8 to yield a peripheral or annular gap of constant width over the entire periphery where the annular collar containing the propellant passageway 1 is applied peripherally or circumferentially thereto.

This propellant passageway in developed or unwrapped form as shown in FIGS. 1 and 3 has its maximum area at the supply conduit 10 and at position 2.

The elongated slot or annular gap 4 will be of constant width from one end to the other and from the inlet position 2 to the outlet end 3.

By referring to FIG. 1, it will be noted that there is a short leg at the inlet 2, a long leg at the slot 4 and a hypotenuse 22 which form a right triangle as indicated in FIG. 1.

The outlet from the conveying passage 8 takes the form of a diffuser 14 with a widening angle which may vary from 8 degrees up to 30 degrees, depending upon the twist or rotational effect desired.

This rotational effect is determined by the ratio of the inlet cross section at 2 ($F_k$) to the width of the annular outlet gap 4.

As diagrammatically indicated by the arrows 25 in FIG. 3, the propellant emerges from the gap 4 in constant amount per unit cross section and at an angle to the axis of the passage 1, the value of the angle depending upon the ratio of the width of gap 4 to inflow or inlet cross-section 2.

The compressed gas or air which enters the passageway 8 through the slot 4 will flow inwardly with a whirling motion and the direction of discharge will be determined by the ratio of the blowout slot surface $F_s$ to the passage initial cross section $F_k$. With a decreasing $F_s/F_k$ ratio, the direction of discharge increasingly approaches the vertical to the passage wall of the blowout slot.

Although the incoming air will enter with an inclined or twist component as it flows out through the slot 4, the distribution of the discharged quantity along the slot axis is not influenced, since the radius and hence also the action of the centrifugal force remain approximately constant along the annular periphery.

It is thus apparent that the present applicant has provided a jet conveyor in which the propellant power of the jet of compressed air will give a high delivery in connection with the entrainment of fluid with a maximum uniform distribution and with a constant inclination or twist angle over the entire periphery so that a uniform effect will be obtained over the entire cross sectional area of the conveyor.

Annular slots are altogether avoided and the entraining fluid or compressed air will flow at a constant speed through the entire length of the passageway 1 in view of the gradual decrease of the cross sectional passageway area.

The efficiency of the jet will be greatly enhanced and energy will not be lost because of the striking of the jet against baffles or against the wall of the housing.

It is not necessary to use spirally tapering passageways which communicate with the interior of the diffuser through passageways discharging into said diffuser in an approximately tangential direction.

If desired, a plurality of propellant passages 1 disposed successively in the direction of conveyance may be disposed around one conveying passage and/or the propellant passage may be divided up into a plurality of individual passages over the periphery of the conveying passage, said individual passages adjoining one another in the peripheral direction of the conveying passage.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A jet conveyor for conveying fluids having an exterior main cylindrical conveying outlet passageway of circular cross section, a central interior concentric inlet passageway positioned inside of and projecting partly into the initial portion of said main circular cross section conveying passageway, the spacing between the end of the interior passageway and the interior of the exterior conveying passageway constituting a circular peripheral outlet slot serving to feed the conveying gas into the outlet passageway around the periphery thereof of the same width throughout over the entire circumference of the concentric exterior passageway and interior inlet passageway and a transverse passageway to feed conveying gas to said circular outlet slot and an encircling communication chamber encircling said concentric passageways and feeding conveying gas from the transverse passageway to the outlet slot having a maximum flow area into the slot at the inlet of the chamber and decreasing to a minimum flow area as it passes around the concentric communication chamber.

2. A jet conveyor for conveying gases having a main cylindrical passageway of circular cross section, an inlet passageway of circular cross section and a conical outlet passageway divergent in the direction of flow, said main inlet and outlet passageways all having a common main central axis extending longitudinally of the conveyor, said inlet passageway having a convergent nozzle in the direction of flow from the inlet passageway to the main passageway which convergent nozzle projects into the main passageway and forms a peripheral inlet slot between the main passageway and the convergent nozzle, said slot extending entirely around the main passageway and the convergent nozzle and having the same width entirely around said periphery and a transversely extending inlet propellant conduit and an encircling spiral chamber serving as a conduit connection between the propellant conduit and the slot and extending around the main passageway and inlet passageway and having an inlet and the cross sectional area of said chamber decreasing away from the inlet as it encircles the main and inlet passageways.

References Cited in the file of this patent

UNITED STATES PATENTS

| | | |
|---|---|---|
| 387,177 | Murphy | July 31, 1888 |
| 1,500,534 | Swift | July 8, 1924 |
| 1,612,838 | Schutz | Jan. 4, 1927 |
| 2,826,147 | Gaubotz | Mar. 11, 1958 |

OTHER REFERENCES

Germany, Application KL. 27d 1, 1,020,762, Dec. 12, 1957.